(12) United States Patent
Traa

(10) Patent No.: US 6,222,660 B1
(45) Date of Patent: Apr. 24, 2001

(54) ADAPTIVE POWER SUPPLY FOR AVALANCHE PHOTODIODE

(75) Inventor: Einar O. Traa, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/094,438

(22) Filed: Jun. 9, 1998

(51) Int. Cl.[7] .................................................. H04B 10/06
(52) U.S. Cl. ........................................................... 359/189
(58) Field of Search .................................... 359/189, 193, 359/194, 195, 161, 158

(56) References Cited

U.S. PATENT DOCUMENTS

| 5,808,760 | * | 9/1998 | Gfeller ................................. | 359/110 |
| 5,953,690 | * | 9/1999 | Lemon et al. ...................... | 702/191 |
| 6,072,609 | * | 6/2000 | Masuda ................................ | 359/110 |

* cited by examiner

Primary Examiner—Jason Chan
Assistant Examiner—Christina Y Leung
(74) Attorney, Agent, or Firm—Francis I. Gray

(57) ABSTRACT

An adaptive power supply for an avalanche photodiode (APD) is used to determine an optimum bias voltage. Without an optical signal input the adaptive power supply applies a swept voltage to the APD while monitoring the photodiode current. When breakdown occurs, the voltage is noted and the bias voltage from the adaptive power supply is set at a specified offset below the breakdown voltage. Where a source of optical digital data signal is present, it is coupled to the input of the APD via a programmable optical attenuator. The electrical digital signal output from the APD is input to a bit error rate counter, the output of which is monitored. For different optical power levels the APD bias voltage is swept by the adaptive power supply, determining a constant power level curve over which the bit error rate is virtually zero. This is repeated for a plurality of optical power levels, the resulting family of curves defining a region within the bit error rate is virtually zero. The adaptive power supply is set to a value that falls within the virtually zero bit error rate region for the expected optical power level input.

4 Claims, 2 Drawing Sheets

ADAPTIVE POWER SUPPLY FOR AVALANCHE PHOTODIODE

BACKGROUND OF THE INVENTION

The present invention relates generally to avalanche photodiode (APD) gain control circuits, and more specifically to a method using an adaptive power supply for avalanche photodiodes that provides a means for determining an optimum bias voltage for the APD.

Avalanche photodiodes are used in optical receivers for converting an optical signal into an electrical signal. The electrical signal output from the APD is coupled to an amplifier for amplification. One of the most important parameters of an APD is the reverse bias voltage associated with breakdown. When operated below the reverse breakdown voltage, increases in reverse bias results in amplification. This is the region of normal APD operation. However at the breakdown voltage dark currents increase exponentially, causing the receiver to be saturated with noise and possibly damaging or destroying the APD.

Therefore the APD generally is biased close to its breakdown voltage to achieve maximum sensitivity. Typically the bias voltage for an APD is set at a specified number of volts, such as five volts, below the specified breakdown voltage. However since each APD is different, the breakdown voltage of each APD is different. This requires different bias voltages from APD to APD.

A measure of the reliability of an APD is the ability to pass optical digital data signals with a virtually zero bit error rate (BER)—for SONET systems the virtually zero BER is specified to be $10^{-10}$ or less. For different optical power levels, the bias voltage at which the bit error rate becomes non-zero differs. Especially at larger voltages and/or larger optical power levels the APD generates more noise which causes the bit error rate to be non-zero.

What is desired is a method using an adaptive power supply for an avalanche photodiode for determining an optimum bias voltage for the avalanche photodiode.

BRIEF SUMMARY OF THE INVENTION

Accordingly the present invention provides an adaptive power supply for an avalanche photo-diode that may be part of the APD circuit board. The adaptive power supply is coupled to the APD via a current sense circuit and a load resistor. The bias voltage provided by the adaptive power supply to the APD is determined by a digital control voltage from a controller that is part of the APD circuit board. The APD current sensed by the current sense circuit is fed back to the controller. The measure of the actual breakdown voltage for the APD is achieved without optical input to the APD by gradually increasing the bias voltage from a voltage significantly below the specified breakdown voltage from the adaptive power supply while sensing the APD current. When the sensed APD current indicates breakdown, the voltage at that point is stored as the breakdown voltage. The controller then establishes an optimum bias voltage as being a specified number of volts below the actual measured breakdown voltage. Where the APD is used in a receiver that processes an optical data signal, such as a SONET/ATM signal having an overhead with parity checking, the optical data signal source is coupled to the APD via a programmable optical attenuator for varying the input optical power level. The electrical signal output from the APD is processed by an amplifier. The output from the amplifier is input to a clock and data recovery circuit, and the recovered data is input to an overhead bit error rate counter. For each of a plurality of optical power level settings determined by the programmable optical attenuator, the power supply voltage is varied to develop a family of current-voltage curves. The point on each curve where the bit error rate becomes non-zero is indicated to generate an envelope defining a region within which the bit error rate is zero. The point on the envelop for the expected optical power level closest to the breakdown voltage is determined to be the optimum bias point for the avalanche photodiode for digital data applications.

The objects, advantages and other novel features of the present invention are apparent from the following detailed description when read in conjunction with the appended claims and attached drawing.

DETAILED DESCRIPTION OF THE INVENTION

Figure 1:
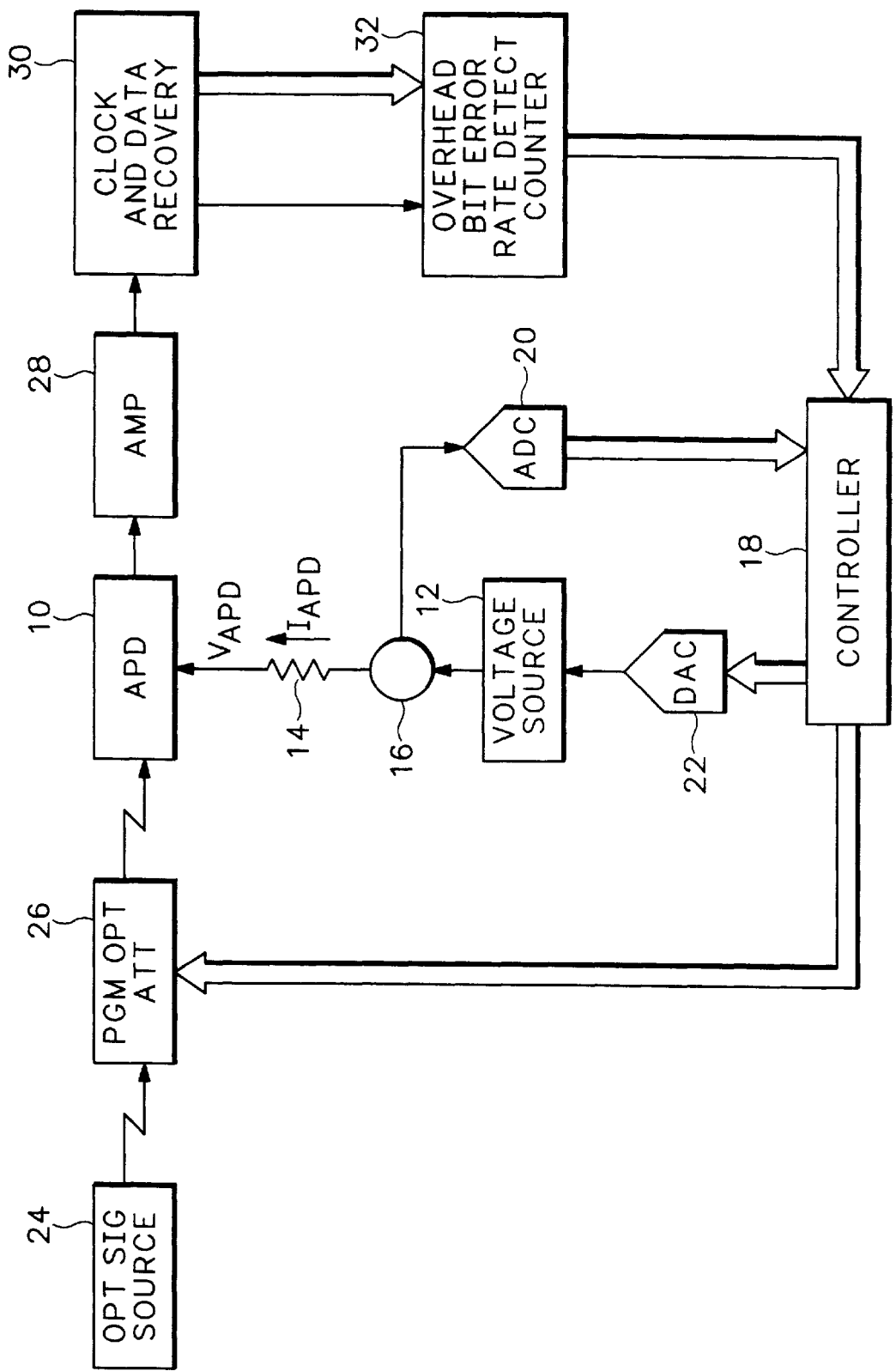
FIG. 1 is a block diagram view of a system on an APD circuit board for testing an avalanche photodiode using an adaptive power supply to determine an optimum bias point according to the present invention.

Referring now to FIG. 1 an avalanche photo-diode (APD) 10 is coupled to an adaptive power supply 12 via a load resistor 14 and a current sensing circuit 16. The current $I_{APD}$ sensed by the current sensing circuit 16 is fed back to a controller 18 via an analog to digital converter (ADC) 20. The controller 18 provides a control signal to the adaptive power supply 12 via a digital to analog converter (DAC) 22 to control the bias voltage $V_{APD}$ applied by the adaptive power supply to the APD 10.

A first method of obtaining an optimum bias voltage for the APD 10 is to determine the breakdown voltage for the APD. Starting at a voltage value significantly below the specified breakdown voltage for the APD 10, and without any optical input to the APD, the controller 18 causes the adaptive power supply 12 to gradually increase the voltage applied to the APD in small increments. When the current $I_{APD}$ from the current sensor circuit 16 indicates breakdown, the voltage $V_{APD}$ being applied by the adaptive power supply 12 at that point is stored in the controller 18 as the actual breakdown voltage for the APD 10. The controller 18 then sets the bias voltage $V_{APD}$ at a value a specified number of volts less than the actual breakdown voltage. Since the breakdown voltage is accurately known, the specified number of volts that the bias voltage is backed off from the breakdown voltage may be less than previously used when using the specified breakdown voltage from the manufacturer's data sheet.

For determining an optimum bias voltage for optical digital data applications, a calibrated optical data signal, such as an ATM/SONET optical data signal having an overhead with parity checking, from an optical source 24 is applied via a programmable optical attenuator 26 to the APD 10. The electrical output from the APD 10 is processed by an amplifier 28 and input to a clock and data recovery circuit 30. The recovered data together with the recovered clock are input to an overhead bit error rate (BER) detect counter 32. The output from the BER counter 32 is input to the controller 18. The controller 18 controls the optical power level input to the APD 10 by applying an aftenuator control signal to the optical attenuator 26.

Figure 2:
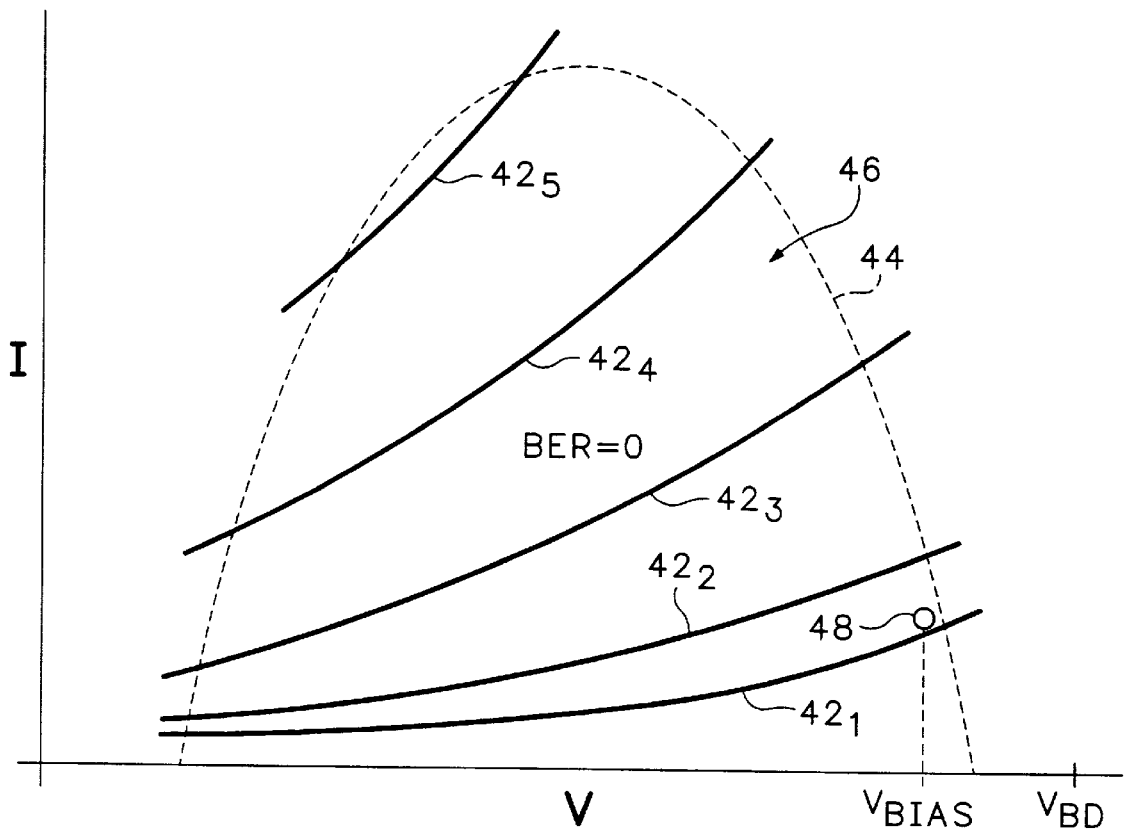
FIG. 2 is a graphic view of a family of curves for an avalanche photodiode obtained according to the present invention.

In an alternative method of obtaining an optimum bias voltage for the APD 10, a family of constant optical power level curves are generated, with each optical power level being determined by the programmable optical attenuator 26 in response to the attenuation command from the controller 18. For each optical power level the controller 18 causes the voltage from the adaptive power supply 12 to sweep through a range of voltages while observing the output from the BER counter 32. The voltage values at which the output from the BER counter 32 changes from virtual zero to non-zero are determined. FIG. 2 shows the family of constant optical power level curves $42_{1-5}$, from minimum to maximum power levels. These curves have end points, indicated by "X", between which the output from the BER counter 32 is virtually zero and beyond which the output is non-zero. The "X"s form an envelope 44 that defines an area 46 where the bit error rate is virtually zero. The bias voltage from the adaptive power supply 12 for the APD 10 is then set at a voltage value 48 that is just within the virtual zero BER area 46 closest to the breakdown voltage for the optical power level expected.

Thus the present invention uses an adaptive power supply for an avalanche photodiode to determine either an actual breakdown voltage for the APD, from which a specified voltage is subtracted to obtain the optimum bias voltage, or for an optical digital data application an envelope as a function of optical power levels within which a bit error rate for the optical digital data is zero, the optimum bias voltage being that for a given optical power level that is at the edge of the envelop at the highest possible voltage.

What is claimed is:

1. A method of determining an optimum bias voltage for an avalanche photodiode that converts an optical data signal to an electrical data signal for optical digital data applications comprising the steps of:

applying a calibrated optical data signal via a programmable optical attenuator to the avalanche photodiode;

obtaining from the electrical data signal from the avalanche photodiode in response to the calibrated optical data signal a bit error rate;

adjusting a bias voltage for the avalanche photodiode over a range of values to determine a constant optical power level curve for the calibrated optical data signal where the bit error rate is virtually zero; and selecting as the optimum bias voltage a value of the bias voltage at one end of the constant optical power level curve closest to a breakdown voltage for the avalanche photodiode.

2. The method as recited in claim 1 further comprising the steps of:

repeating the applying, obtaining and adjusting steps at different settings of the programmable optical attenuator corresponding to different optical power levels to generate a family of constant optical power level curves where the bit error rate is virtually zero; and selecting as the optimum bias voltage a value of the bias voltage at one end of the constant optical power level curve corresponding to a current setting of the programmable optical attenuator closest to the breakdown voltage for the avalanche photodiode.

3. An apparatus for determining an optimum bias voltage for an avalanche photodiode that converts an optical data signal to an electrical data signal for optical data applications comprising:

a programmable optical attenuator to which the optical data signal is applied as an input, an attenuated optical data signal being output from the programmable optical attenuator and coupled to the avalanche photodiode;

an adjustable bias voltage source coupled to the avalanche photodiode; and means for generating an attenuator control signal to select a setting of the programmable optical attenuator as a function of the electrical data signal from the avalanche photodiode and for adjusting the adjustable bias voltage source as a function of a constant optical power curve where a bit error rate for the electrical data signal is virtually zero corresponding to the setting of the programmable optical attenuator to provide the optimum bias voltage at a point at one end of the constant optical power curve closest to a breakdown voltage for the avalanche photodiode.

4. The apparatus as recited in claim 3 wherein the controlling means comprises:

means for extracting from the electrical data signal digital data and a recovered clock;

means for detecting the bit error rate from the digital data and recovered clock; and means for processing the bit error rate so that when the bit error rate is non-zero the attenuator control signal is generated to select a different setting for the programmable optical attenuator and the optimum bias voltage from the adjustable bias voltage source is adjusted according to the constant optical power curve for the different setting of the programmable optical attenuator.

* * * * *